United States Patent
Hynes et al.

(10) Patent No.: US 7,648,076 B2
(45) Date of Patent: Jan. 19, 2010

(54) MAGNETIC TAPE WITH HOLOGRAPHIC HIDDEN PATTERN, METHOD OF MAKING SAME AND READER FOR READING SAME

(75) Inventors: John Hynes, Reisterstown, MD (US); Lily O'Boyle, Cream Ridge, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 207 days.

(21) Appl. No.: 11/603,691

(22) Filed: Nov. 21, 2006

(65) Prior Publication Data

US 2007/0257102 A1    Nov. 8, 2007

Related U.S. Application Data

(60) Provisional application No. 60/738,846, filed on Nov. 21, 2005.

(51) Int. Cl.
    *G06K 19/06*    (2006.01)
(52) U.S. Cl. ....................... 235/493; 235/457
(58) Field of Classification Search ............... 235/487, 235/493, 494, 457
    See application file for complete search history.

(56) References Cited

U.S. PATENT DOCUMENTS

| 4,013,894 | A   |   | 3/1977  | Foote et al. |
|-----------|-----|---|---------|-----|
| 5,237,164 | A   | * | 8/1993  | Takada ....................... 235/487 |
| 5,432,329 | A   | * | 7/1995  | Colgate et al. ............... 235/487 |
| 6,135,355 | A   |   | 10/2000 | Han et al. |
| 6,244,508 | B1  |   | 6/2001  | Straub |
| 6,328,209 | B1  | * | 12/2001 | O'Boyle ..................... 235/380 |

* cited by examiner

*Primary Examiner*—Seung H Lee
(74) *Attorney, Agent, or Firm*—Matthew A. Pequignot; Pequignot + Myers LLC

(57) ABSTRACT

A holographic magnetic tape comprising a hidden image pattern for protecting against skimming, alteration and counterfeiting of the data encoded in the holographic magnetic tape. The hidden image pattern in a holographic magnetic tape of a transaction card is used to determine the validity of said transaction card and the holographic magnetic tape. This relieves the clerk at the point-of-sale of visually inspecting card which is generally ineffective.

14 Claims, 3 Drawing Sheets

MAGNETIC TAPE WITH HOLOGRAPHIC HIDDEN PATTERN, METHOD OF MAKING SAME AND READER FOR READING SAME

RELATED APPLICATIONS

This application claims priority from U.S. Provisional Application No. 60/738,846 filed Nov. 21, 2005, which is incorporated by reference in its entirety.

BACKGROUND OF THE INVENTION

The present invention relates to a hidden pattern in holographic magnetic (HoloMag™) tape for protection against skimming, alteration and counterfeiting of the data encoded in the holographic magnetic tape.

HoloMag tape is an embossed diffraction grating hologram on top of a magnetic oxide tape that provides visual identification features to the tape and to whatever product the HoloMag tape is applied. Typically HoloMag tape is applied to plastic cards to provide visual identification to the card as well as standard magnetic encoding capabilities to the HoloMag tape on the card. When the plastic card is a financial card (credit or debit card) the HoloMag mag stripe on the card must meet industry magnetic and encoding standards as well as design holographic image standards provided by the customer. The HoloMag tape has been designed to meet all of these standards and industry/customer requirements.

However, in order to further improve the security of these HoloMag tapes, a hidden image pattern, such as hidden image bar code pattern, has been incorporated into HoloMag tapes.

OBJECT AND SUMMARY OF THE INVENTION

Therefore, it is an object of the present invention to provide an improved and novel holographic magnetic tape comprising hidden image pattern and a hidden image pattern reader for reading same.

In accordance with an exemplary embodiment of the present invention, a hidden image pattern in a holographic magnetic tape of a transaction card is used to determine the validity of the transaction card and the holographic magnetic tape, thereby relieving a clerk at the point-of-sale of visually inspecting card which is generally ineffective.

In accordance with an exemplary embodiment of the present invention, the hidden image pattern as aforesaid is a hidden image bar code pattern. The validity of the transaction card is determined by checking the number of bars in the hidden image bar code pattern.

In accordance with an exemplary embodiment of the present invention, the transaction card is one of the following; a credit card, a debit card, a prepaid credit card, a prepaid debit card, a smart card and a store card.

In accordance with an exemplary embodiment of the present invention, the hidden image pattern as aforesaid is used to detect skimming, alteration or counterfeiting of the transaction card.

In accordance with an exemplary embodiment of the present invention, the hidden image pattern in the holographic magnetic tape on a transaction card is not registered to the transaction card and the hidden image pattern is randomly located from a referenced point on the holographic magnetic stripe.

In accordance with an exemplary embodiment of the present invention, the hidden image pattern in the holographic magnetic tape on a transaction card is not registered to the transaction card and the hidden image pattern is encoded in the data stream of the holographic magnetic tape.

In accordance with an exemplary embodiment of the present invention, the hidden image bar code pattern is used to identify an issuer of the transaction card and check the validity of encoded data on the holographic magnetic tape.

In accordance with an exemplary embodiment of the present invention, the validity of the transaction card is determined by comparing the numbers of bars in the hidden image bar code pattern to a first digit of a bank identification number (BIN) in the encoded data on the holographic magnetic tape.

In accordance with an exemplary embodiment of the present invention, the location of the hidden image bar code pattern along the length of the holographic magnetic tape is tied to another fixed location on the holographic magnetic tape. Another fixed location is a leading edge of a first binary encoded one in a start sentinel, thereby linking encoded data to the holographic magnetic tape to prevent skimming from another magnetic stripe card.

In accordance with an exemplary embodiment of the present invention, the hidden image pattern is a hidden image bar code pattern and further comprises a security offset number generated by a security algorithm based on an association of the location of the hidden image bar code pattern and a predetermined point in magnetically encoded data in the holographic magnetic tape.

In accordance with an exemplary embodiment of the present invention, the security offset number is generated during an initial encoding of the data on the holographic magnetic tape and stored in a customer database of an issuing institution or written into discretionary data fields in track 1 or 2 of the holographic magnetic tape.

In accordance with an exemplary embodiment of the present invention, the security offset number is generated during first authorized use of the transaction card. A point-of-sale swipe reader captures and transmits an association between the hidden image bar code pattern and encoded data on the holographic magnetic data during the first authorized use to a database for coupling the association to customer data associated with the transaction card.

In accordance with an exemplary embodiment of the present invention, a spatial distance of the hidden image bar code pattern and the leading edge of the first bit of the start sentinel is read by a read head of a terminal when the holographic magnetic tape is read by the terminal. A security algorithm of the terminal generates a new offset value during the processing of the spatial distance value and compares the new offset value to the security offset value read at initialization.

In accordance with an exemplary embodiment of the present invention, a correlation score between the current read and the initial read establishing the degree of match between the spatial relationships is used to discriminate between authentic data and non-authentic or skimmed data on the holographic magnetic tape.

In accordance with an exemplary embodiment of the present invention, a hidden image bar code pattern reader comprises a laser and detector pair set at a predetermined to read a hidden image bar code pattern in a holographic magnetic tape of a transaction card. The hidden image bar code pattern is used to determine the validity of the transaction card and the holographic magnetic tape, thereby relieving a clerk at the point-of-sale of visually inspecting card which is generally ineffective.

In accordance with an exemplary embodiment of the present invention, the laser and detector pair set is a separate laser/detector pair or integrated into a magnetic read head of the reader.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE INVENTION

Figure 1:
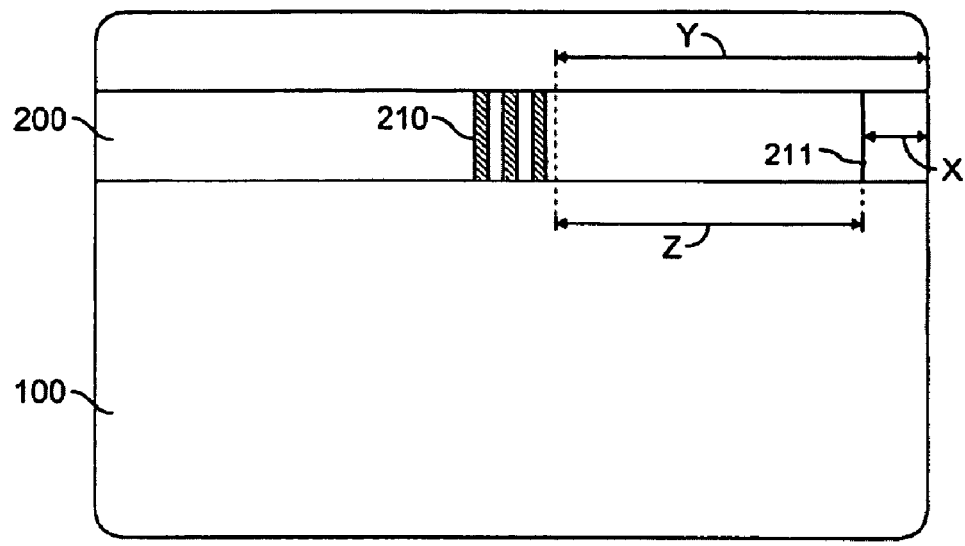
FIG. 1 depicts a transaction card incorporating a hidden image pattern on a holographic magnetic strip in accordance with an exemplary embodiment of the present invention.

In accordance with an exemplary embodiment of the present invention, as shown in FIG. 1, the holographic magnetic (HoloMag) tape 200 comprises the magnetic and visual image features of the HoloMag tape as well as a special hidden image 210. The hidden image 110 is included in the embossed diffraction grating pattern of the holographic pattern at origination of the holographic image. The hidden image 210 can take many different forms. One particular pattern is a bar code pattern 210 which will appear as light and dark bars when viewed with laser light at the correct angles of illumination and viewing/detection as shown in FIG. 1.

The hidden image bar code pattern 210 can be used to provide additional identity to the HoloMag tape 200 and to products to which it is applied. In the case of magnetic stripe plastic cards 100 the HoloMag stripe with a hidden image bar code pattern 210 can be used to provide customer (card issuer) identification as well as special relationships to the standard magnetically encoded data in the magnetic tape portion of the HoloMag stripe 200. This special relationship can take the form of a spatial relationship to the magnetically encoded data and the hidden image bar code pattern 210.

The generation of the HoloMag holographic pattern is a repeated pattern down the length of the tape 200. For plastic cards of 3.375 inch in length the repeat pattern is setup such that the pattern repeats more than once down the full length of the card 100. The HoloMag tape 200 is not registered to the transaction card 100 along the card's length. The application of the HoloMag tape 200 to the plastic or transaction card 100 can place the hidden image bar code pattern 210 anywhere along the length of the HoloMag stripe (y in FIG. 1). In this way the hidden image bar code pattern 210 built into the HoloMag holographic pattern can appear anywhere along the length of HoloMag stripe 200 on the plastic card 100. The location of the hidden image bar code pattern is therefore a randomly located along the HoloMag stripe's length. This random location of the hidden image bar code pattern 210 can be used to uniquely identify the plastic card 100.

The hidden image bar code pattern 210 can be constructed of different number of bars and spaces. The number of bars and spaces in the HoloMag hidden image bar code pattern 210 can be used to identify the type of plastic credit/debit card 100. For example 17 bars can be used to identify an Amex card, 4 bars to identify a Visa card and 9 bars to identify a MasterCard. Many combinations of bars and spaces can be generated to provide a unique identity for various plastic/transaction card application, such as a financial plastic/transaction card application.

The hidden image bar code pattern 210 can provide a secure identification to the HoloMag stripe 200 on a card 100. The HoloMag stripe 200 is of sufficient complexity and difficulty in generation that the hidden image bar code pattern 210 is almost impossible to copy and/or alter. This unique and unalterable identification provided by the hidden image bar code pattern 210 can be used to secure the plastic card 100 and the data encoded in the magnetic portion of the HoloMag stripe 200.

Level 1 Protection

The hidden image bar code pattern 210 can be used to identify the issuing institution in the HoloMag stripe 200 on the card 100. For example, the hidden image pattern with 4 bars can be used to identify a Visa card. Reading the hidden image bar code pattern 210 with a laser and detector in a card reader 300 can provide the clerk at the Point-of-Sale with a positive identification of the card as a genuine VISA card 100. This saves the clerk the visual inspection of the HoloMag image on the stripe as a form of identification of the card as a genuine VISA card 100.

Level 2 Protection

The hidden image bar code pattern 210 can be use in conjunction with the magnetic encoded data to provide a protection against skimming. The reading of the band identification number (BIN) number encoded in the Track 1 and Track 2 data of the magnetic stripe contains the issuer ID; for example a BIN beginning with a four (4) is a VISA BIN. The issuer's ID encoded in the BIN in the magnetic stripe can then be compared to the hidden image bar code pattern 210 in the holographic image to see if the two are correct. For example a four bar pattern in the hidden image bar code pattern indicates that this is a genuine VISA HoloMag stripe 200 and a comparison to the first digit in the BIN indicates that that data belong on a genuine VISA HoloMag stripe 200. If the data is skimmed to a non-VISA card such as a MasterCard with a genuine HoloMag stripe 200 then the hidden image bar code pattern 210 associated with a MasterCard being 9 bars will not agree with the skimmed VISA ID data and the transaction will be rejected. If the data is skimmed from a genuine VISA card to a non-HoloMag stripe card 100 then the absence of the hidden image bar code pattern 210 will not authorize the transaction if the BIN identifies the card as having a HoloMag stripe 200. Level 2 protection provides identification of the card as a genuine Visa, MasterCard or Amex card and that the data encoded on the stripe 200 belongs on that issuer's stripe.

Level 3

For a stronger protection against skimming the data from one HoloMag stripe 210 to any other HoloMag stripe 210, a relationship is established between the hidden image bar code pattern 210 and the standard encoded data in the magnetic stripe. The hidden image bar code pattern 210 is randomly located on the magnetic stripe since the HoloMag is not registered to the card 100 during application. This random location can be accurately measured from the edge of the card 100 or from the first bit in the start sentinel of the magnetically encoded data (y in FIG. 1). For example, y is from the edge of the card 100 to the lead edge of the first bar in the holographic bar code image pattern 210 in FIG. 1. This provides one reference point for the hidden image bar code pattern 210. The distance from the edge of the card to the leading edge of the first one bit in the start sentinel can also provide a second reference point (x in FIG. 1). These two reference points can be manipulated in a security algorithm to produce a unique lock between the magnetic data and the hidden image bar code pattern 210 such that the magnetically encoded data cannot be skimmed or altered (z in FIG. 1). For example, z is the relative distance between the lead edge of the first bit in the holographic bar code 210 (y) and the lead edge of the first bit in magnetically encoded start sentinel 211 (x); that is to say that the distance z ties the hidden image barcode pattern 210 to another fixed location 211 on the holographic magnetic tape 200. The unique relationship between hidden image bar code pattern 210 and magnetic encoding provides protection against counterfeit, alteration, skimming or copying data to any other card (HoloMag or standard magnetic stripe).

Algorithm Offset Capture

Figure 2:
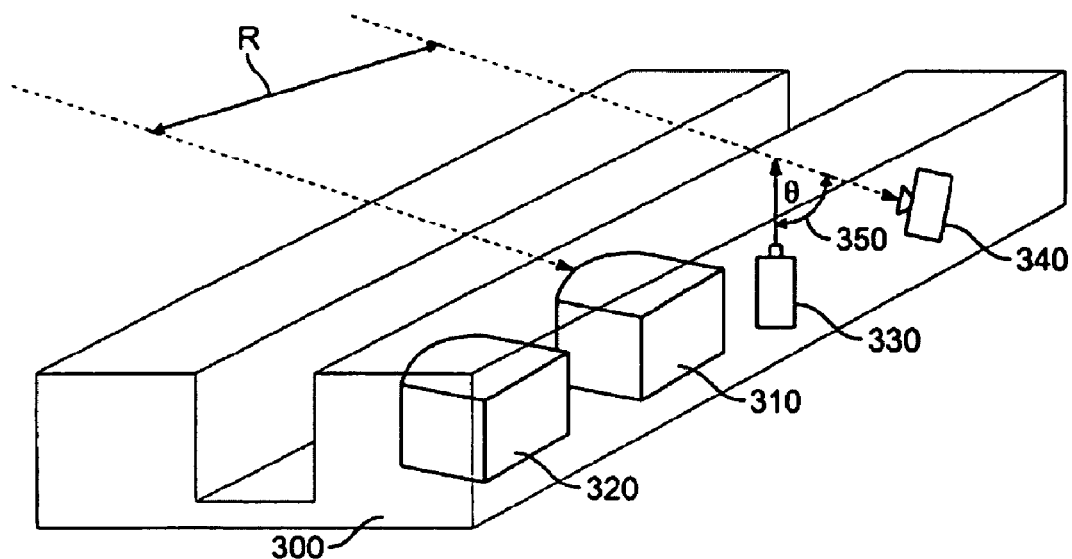
FIG. 2 depicts a point-of-sale terminal capable of reading the holographic magnetic strip comprising the hidden image pattern in accordance with an exemplary embodiment of the present invention.
Figure 3:
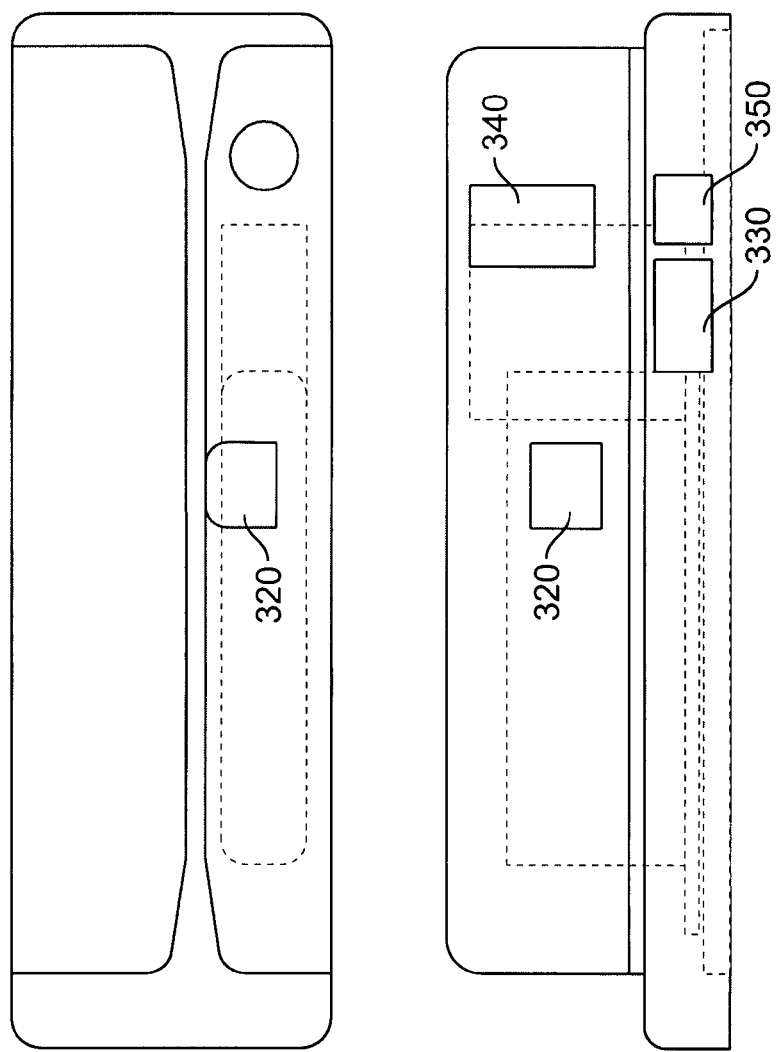
FIG. 3 depicts a hidden image reader comprising a laser and detector in accordance with an exemplary embodiment of the present invention.
Figure 3:
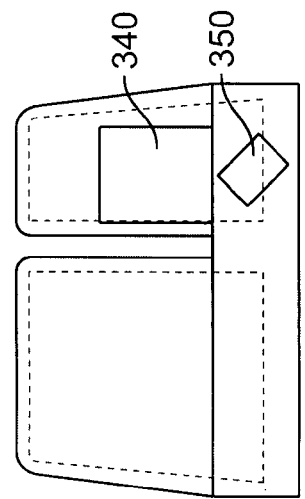
Figure 4:
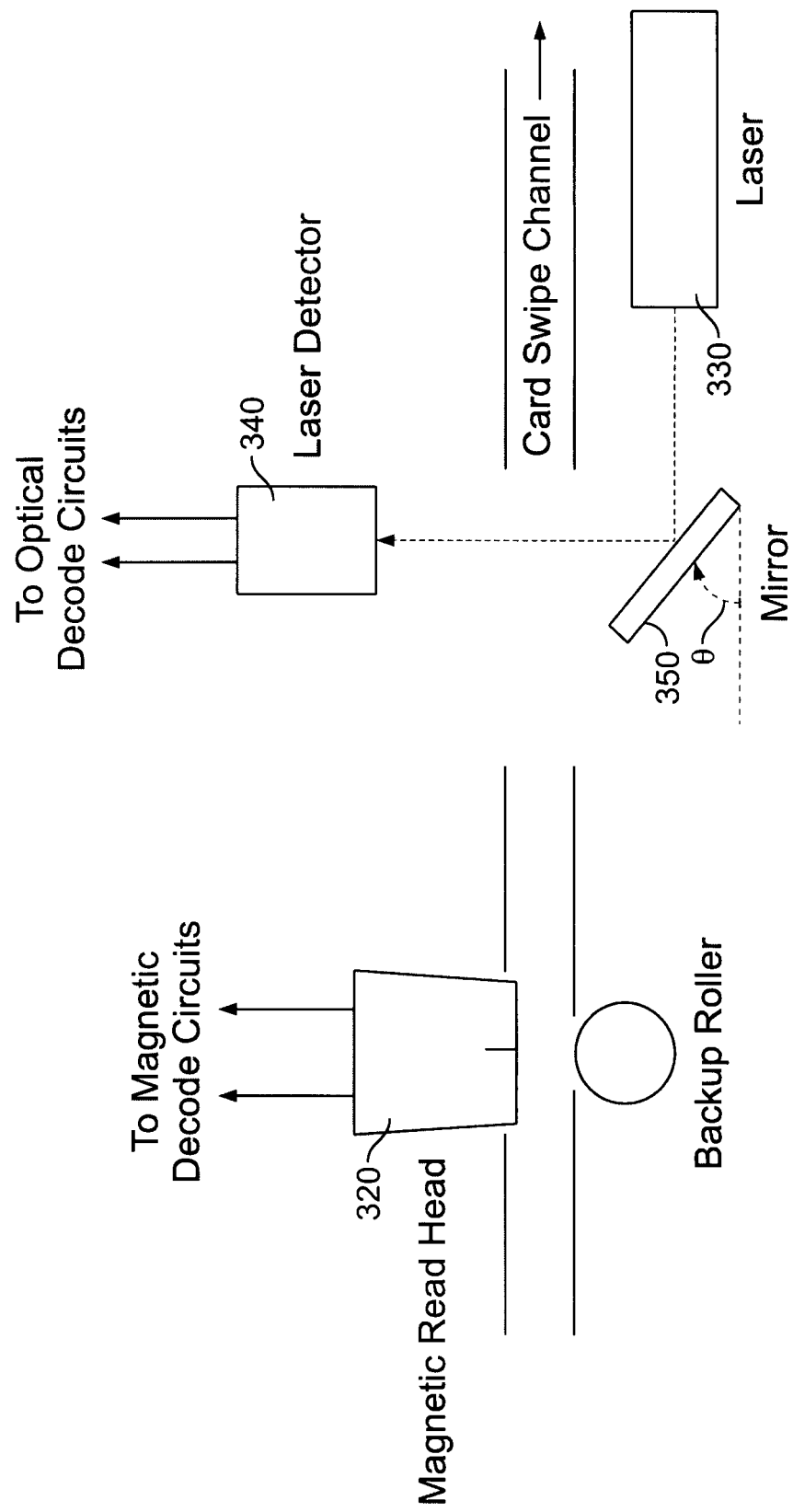
FIG. 4 depicts a hidden image reader comprising a laser and detector in accordance with an exemplary embodiment of the present invention.

The algorithm offset relationship between the location of the leading edge of the first bar (or any other bar or space in the hidden image bar code pattern) and the leading edge of the first binary one (or any other leading/trailing edge of any other bit) in the encoded data can be stored in the issuing institution's data base or in the discretionary security data field in Track 2 of the magnetic stripe (x, y, z in FIG. 1). At initial encoding at personalization a encoder equipped with a hidden image bar code pattern reader 300 of FIGS. 2-4 can establish the spatial relationship between the hidden image bar code pattern 210 and the encoded magnetic data and record the algorithm offset into a database and/or onto the magnetic stripe discretionary security data field. For those HoloMag cards that have already been issued before the personalization equipment have been modified, the spatial relationship between the hidden image bar code pattern 210 and the magnetically encoded data can be established in a hidden image bar code pattern reader 300 at the first authorized usage of both sets of data. This is possible since all of the HoloMag cards 100 that have been issued have the unique hidden image bar code pattern 210 built into the stripe 200 at origination.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, and composition of matter, means, methods and steps described herein. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A hidden image bar code pattern in a holographic magnetic tape of a transaction card is used to determine the validity of said transaction card and said holographic magnetic tape,
    wherein the hidden image bar code pattern in said holographic magnetic tape is not registered to said transaction card and the hidden image bar code pattern is randomly located from a referenced point on said holographic magnetic stripe, and
    wherein the location of the hidden image bar code pattern along the length of said holographic magnetic tape is tied to another fixed location on said holographic magnetic tape.

2. The hidden image bar code pattern of claim 1, wherein said another fixed location is a leading edge of a first binary encoded one in a start sentinel, thereby linking encoded data to said holographic magnetic tape to prevent skimming from another magnetic stripe card.

3. The hidden image bar code pattern of claim 2, further comprising a security offset number generated by a security algorithm based on an association of the location of said hidden image bar code pattern and a predetermined point in magnetically encoded data in said holographic magnetic tape.

4. The hidden image bar code pattern of claim 3, wherein said security offset number is generated during an initial encoding of the data on said holographic magnetic tape and stored in a customer database of an issuing institution or written into discretionary data fields in track 1 or 2 of said holographic magnetic tape.

5. The hidden image bar code pattern of claim 3, wherein said security offset number is generated during first authorized use of said transaction card; and wherein a point-of-sale swipe reader captures and transmits an association between said hidden image bar code pattern and encoded data on said holographic magnetic tape during said first authorized use to a database for coupling said association to customer data associated with said transaction card.

6. The hidden bar code image pattern of claim 3, wherein a spatial distance of the hidden image bar code pattern and said leading edge of the first bit of the start sentinel is read by a read head of a terminal when said holographic magnetic tape is read by said terminal; wherein a security algorithm of said terminal generates a new offset value during the processing of said spatial distance and compares said new offset value to said security offset value read at initialization.

7. The hidden bar code image pattern of claim 6, wherein a correlation score between the current read and the initial read establishing the degree of match between the spatial relationships is used to discriminate between authentic data and non-authentic or skimmed data on said holographic magnetic tape.

8. A hidden image pattern in a holographic magnetic tape of a transaction card is used to determine the validity of said transaction card and said holographic magnetic tape, wherein the hidden image pattern in said holographic magnetic tape is not registered to said transaction card and the hidden image pattern is randomly located from a referenced point on said holographic magnetic stripe, and wherein the location of the hidden image pattern along the length of said holographic magnetic tape is tied to another fixed location on said holographic magnetic tape.

9. The hidden image pattern of claim 8, wherein said another fixed location is a leading edge of a first binary encoded one in a start sentinel, thereby linking encoded data to said holographic magnetic tape to prevent skimming from another magnetic stripe card.

10. The hidden image pattern of claim 9, further comprising a security offset number generated by a security algorithm based on an association of the location of said hidden image pattern and a predetermined point in magnetically encoded data in said holographic magnetic tape.

11. The hidden image pattern of claim 10, wherein said security offset number is generated during an initial encoding of the data on said holographic magnetic tape and stored in a customer database of an issuing institution or written into discretionary data fields in track 1 or 2 of said holographic magnetic tape.

12. The hidden image pattern of claim 10, wherein said security offset number is generated during first authorized use of said transaction card; and wherein a point-of-sale swipe reader captures and transmits an association between said hidden image pattern and encoded data on said holographic magnetic tape during said first authorized use to a database for coupling said association to customer data associated with said transaction card.

13. The hidden image pattern of claim 10, wherein a spatial distance of the hidden image pattern and said leading edge of the first bit of the start sentinel is read by a magnetic read head of a terminal when said holographic magnetic tape is read by said terminal; wherein a security algorithm of said terminal generates a new offset value during the processing of said spatial distance and compares said new offset value to said security offset value read at initialization.

14. The hidden image pattern of claim 13, wherein a correlation score between the current read and the initial read establishing the degree of match between the spatial relationships is used to discriminate between authentic data and non-authentic or skimmed data on said holographic magnetic tape.

* * * * *